US 9,894,491 B2

(12) United States Patent
Oliver et al.

(10) Patent No.: US 9,894,491 B2
(45) Date of Patent: Feb. 13, 2018

(54) CONTEXT-BASED WIRELESS NETWORK LINK ACCESS PRIORITIZATION SYSTEM

(71) Applicant: Ford Global Technologies, LLC, Dearborn, MI (US)

(72) Inventors: Douglas A. Oliver, Redford, MI (US); Jayanthi Rao, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 45 days.

(21) Appl. No.: 14/719,785

(22) Filed: May 22, 2015

(65) Prior Publication Data

US 2016/0345341 A1    Nov. 24, 2016

(51) Int. Cl.
*H04W 4/04* (2009.01)
*H04W 4/02* (2009.01)
*H04W 48/18* (2009.01)

(52) U.S. Cl.
CPC .......... *H04W 4/046* (2013.01); *H04W 4/027* (2013.01); *H04W 4/028* (2013.01); *H04W 48/18* (2013.01)

(58) Field of Classification Search
CPC ...... H04W 36/32; H04W 36/14; H04W 36/30
USPC ........................................................ 370/329
See application file for complete search history.

(56) References Cited

U.S. PATENT DOCUMENTS

| 6,711,408 | B1* | 3/2004 | Raith .................... H04W 36/32 340/988 |
| 8,514,825 | B1 | 8/2013 | Addepalli et al. |
| 2005/0014515 | A1* | 1/2005 | Suzuki .................. H04W 36/32 455/456.1 |
| 2010/0118769 | A1* | 5/2010 | Agarwal ............ H04B 7/18578 370/321 |
| 2012/0039248 | A1 | 2/2012 | Schneider et al. |
| 2015/0055471 | A1* | 2/2015 | Hellhake ............. H04L 47/2458 370/235 |
| 2016/0150451 | A1* | 5/2016 | Barreto ................. H04W 36/14 370/332 |

OTHER PUBLICATIONS

Meneguette, Rodolfo I., et al., A Seamless Flow Mobility Management Architecture for Vehicular Communication Networks, Journal of Communications and Networks, Apr. 2013, vol. 15, No. 2, 10 pages.
Leontiadis, Ilias, et al., Extending Access Point Connectivity Through Opportunistic Routing in Vehicular Networks, INFOCOM, 2010 Proceedings, IEEE, Mar. 2010, 5 pages.

* cited by examiner

*Primary Examiner* — Sai Ming Chan
(74) *Attorney, Agent, or Firm* — Jennifer Stec; Brooks Kushman P.C.

(57) ABSTRACT

A vehicle wireless network access system includes a wireless connection switch disposed within a vehicle and configured to, in response to receiving a data transfer request, establish a wireless connection with one of a plurality of network links according to a prioritization of the network links that is based on a speed of the vehicle and an expected path of travel of the vehicle relative to the network links.

20 Claims, 4 Drawing Sheets

CONTEXT-BASED WIRELESS NETWORK LINK ACCESS PRIORITIZATION SYSTEM

TECHNICAL FIELD

The present disclosure relates to systems and methods for providing prioritized context-based wireless network link access.

BACKGROUND

Vehicles are often equipped to establish a wireless network connection with a variety of network links whose signal extends to a geographic location within near vicinity of the vehicle. The flow of digital data via the wireless network link, however, may be interrupted when the vehicle leaves the range of the wireless signal. A vehicle operator may thus experience a disruption in data transfer services, e.g., streaming multimedia, file transfer, etc., performed by the vehicle via the wireless network link.

SUMMARY

A vehicle wireless network access system includes a wireless connection switch disposed within a vehicle and configured to, in response to receiving a data transfer request, establish a wireless connection with one of a plurality of network links according to a prioritization of the network links that is based on a speed of the vehicle and an expected path of travel of the vehicle relative to the network links.

A method for a vehicle includes in response to receiving a data transfer request, establishing a wireless connection with one of a plurality of network links according to a prioritization of the network links that is based on a speed of the vehicle and an expected path of travel of the vehicle relative to the network links.

A method for a vehicle includes, in response to receiving a data transfer request, identifying first and second network links. The first network link has a lower signal strength and is located further away than the second network link. The method also includes establishing a wireless connection with the first network link and not the second network link based on vehicle speed and an expected path of travel toward the first network link and away from the second network link.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
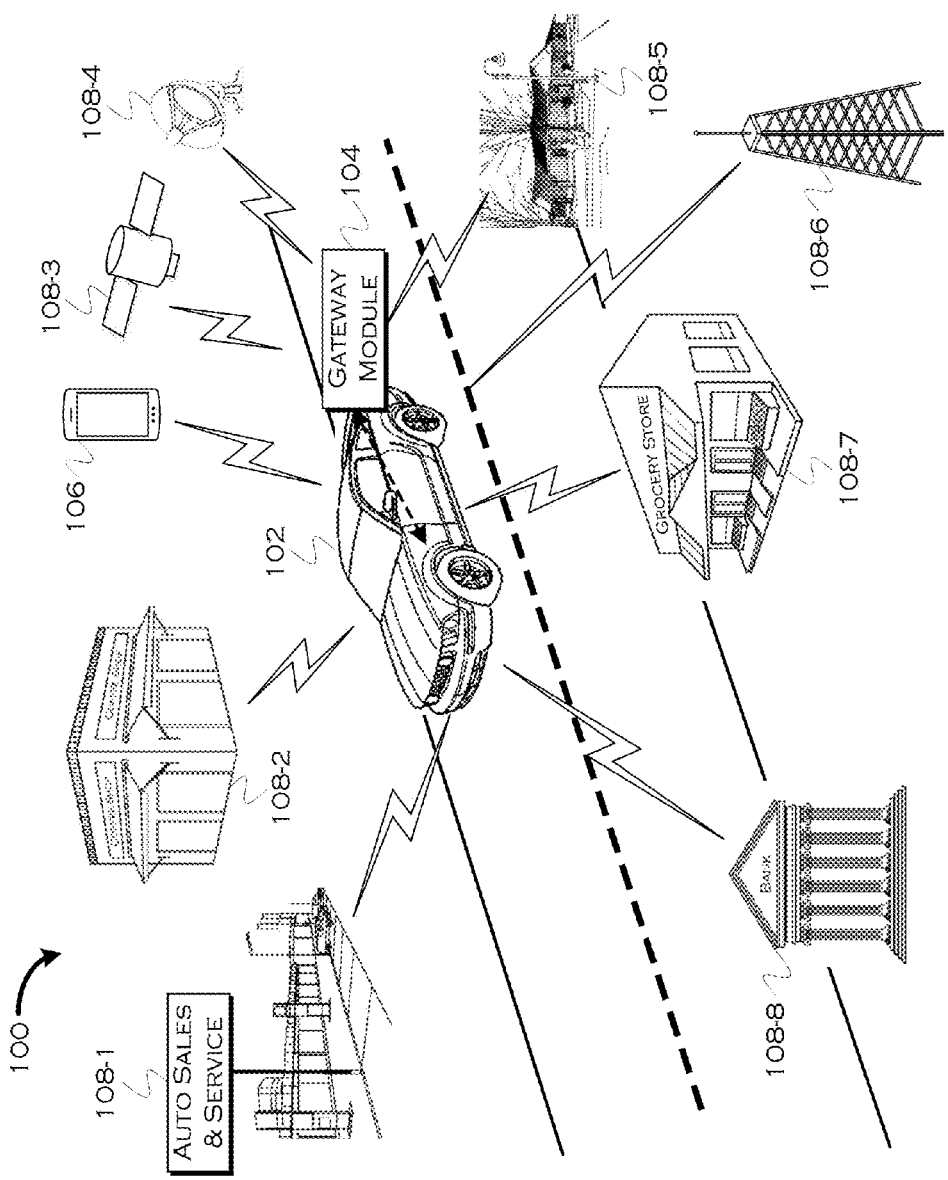
FIG. 1 is a block diagram illustrating a context-based wireless network link access prioritization system.

In reference to FIG. 1, a vehicle communication system 100 for connecting to a variety of wireless network links is shown. The vehicle communication system 100 may include a vehicle 102 having a gateway module 104. The gateway module 104 is a communication module configured to communicate with a vehicle data bus (e.g., a CAN bus) that provides access to various other vehicle modules, such as an engine control module (ECM), a navigation module having a Global Positioning System (GPS) receiver, and others. The gateway module 104 is further configured to communicate with a mobile device 106, such as a mobile phone, a tablet, a laptop, a portable media player, etc.

The gateway module 104 is also configured to communicate with a variety of wireless network links providing digital network access via fixed and moving signal sources 108, such as satellites, base stations, relay stations, access points, routers, ground stations, gateways, and so on. The gateway module 104 transmits and receives digital data from the network links including but not limited to wireless personal area networks (WPANs), wireless local area networks (WLANs), wireless mesh networks, wireless metropolitan area networks (WMANs), wireless wide area networks (WWANs), cellular networks, global area networks (GAN), dedicated short-range communications (DSRC), tethered connections, and so on. For example, the gateway module 104 may transmit and receive digital data using any number of data communication networks, such as GSM (2G), ITU IMT-2000 (3G), IMT-Advanced (4G), IEEE 802.11a/b/g/n (Wi-Fi), WiMax, ANT™, ZigBee®, Bluetooth®, Near Field Communications (NFC), and others.

Figure 2:
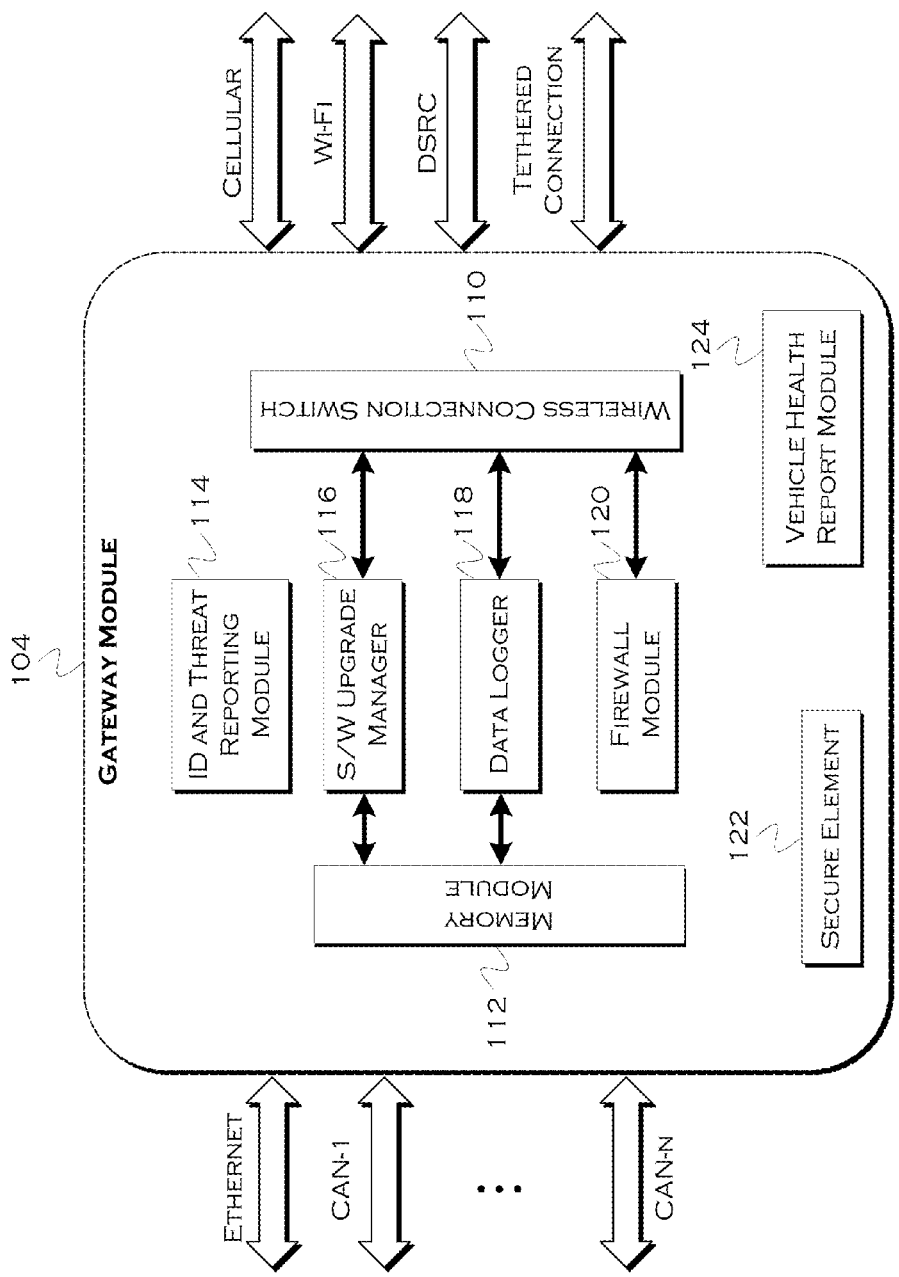
FIG. 2 is a block diagram illustrating a gateway module for a vehicle configured to perform context-based wireless network link access prioritization.

In reference to FIG. 2, the gateway module 104 for context-based wireless network link access prioritization is shown. As described in reference to FIG. 1, the gateway module 104 is configured to communicate with the vehicle data bus to transmit and receive digital data associated with the vehicle 102. In one example, the gateway module 104 may be integrated within a smart data link connector or within a telecommunications module of the vehicle 102.

The gateway module 104 includes a wireless connection switch 110. The wireless connection switch 110 is a network switch configured to, in response to receiving a data transfer request, establish a connection with any number of the wireless network links, such as cellular, Wi-Fi, DSRC, tethered, and others. As described further in reference to FIGS. 3-6, the wireless connection switch 110 prioritizes a set of network links whose range extends to the location of the vehicle 102 and connects to an optimal network link.

In one example, the wireless connection switch 110 may determine a variety of factors, such as data request type, wireless link quality metrics, and others. The wireless connection switch 110 may then prioritize available wireless network links based on the determined factors and according to a set of prioritization policies. A prioritization policy of the wireless connection switch 110 may, for example, include determining vehicle speed of the vehicle 102 and prioritizing available wireless network links, in response to determining that the vehicle speed exceeds a predetermined threshold. In another example, a prioritization policy of the wireless connection switch 110 may include requesting a quality of service (QoS) from each of a variety of available wireless network links and connecting to at least one of the available wireless network links that is able to guarantee a particular QoS.

The gateway module 104 further includes a memory module 112, an ID and threat reporting module 114, a software upgrade manager 116, a data logger 118, and a firewall module 120. The memory module 112 may include a non-persistent storage, e.g., random access memory (RAM), and persistent storage, a hard disk drive (HDD) or flash memory. The ID and threat reporting module 114 is configured to prevent threats and damage using encryption, e.g., WPA/WEP keys, and other security methods. The software upgrade manager 116 detects and installs available software updates via the vehicle data bus. The data logger 118 is configured to capture and record gateway module data flow. The firewall module 120 monitors and filters network traffic to prevent a malicious intrusion.

The gateway module 104 may further include a secure element 122 and a vehicle health report (VHR) module 124. The secure element 122 stores access keys and identifying credentials of the vehicle modules. The VHR module 124 is configured to detect vehicle diagnostic conditions, determine their severity, and generate a vehicle health report for the owner of the vehicle 102.

Figure 3:
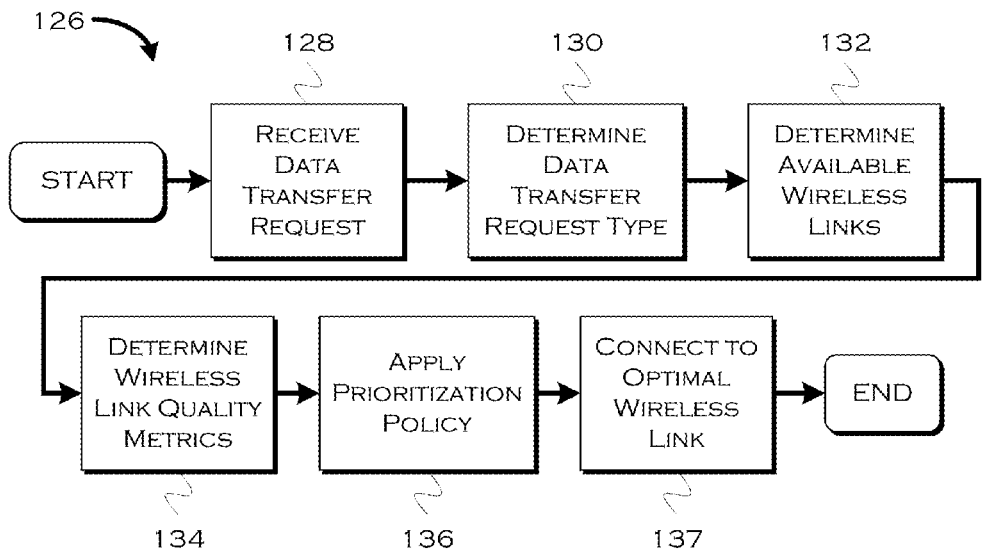
FIG. 3 is a flowchart illustrating an algorithm for prioritizing available wireless network links.

In reference to FIG. 3, a control strategy 126 for prioritizing available wireless network links is shown. As mentioned previously in reference to FIG. 2, the wireless connection switch 110 prioritizes a set of wireless networks links whose range extends to the location of the vehicle 102. The control strategy 126 may start at block 128 where the wireless connection switch 110 receives a data transfer request from the mobile device 106. For example, the wireless connection switch 110 may receive a request to upload, download, or stream a multimedia file, e.g., an image file, text file, video file, audio file, etc.

At block 130, in response to receiving a data transfer request, the wireless connection switch 110 determines a data transfer request type. For example, the wireless connection switch 110 may determine that the requested data transfer is a request to place a wireless emergency call, e.g., eCall, to download or to stream a multimedia file, to perform data logging, to conduct data analytics, to check calendar information, to analyze navigation route information, and so on.

At block 132, in response to determining a data transfer request type, the wireless connection switch 110 determines available wireless network links, e.g., network links whose range extends to the location of the vehicle 102. For example, the wireless connection switch 110 may scan frequency bands for an available connection to an access point, base station, relay station, router, ground station, or gateway. The wireless connection switch 110 at block 134 determines wireless link quality metrics of at least one of the available wireless network links. The wireless link quality metrics may, for example, include signal strength, signal range, and other metrics. In one example, the wireless link quality metrics may be based on connections previously made to the at least one of the available wireless network links.

At block 136 the wireless connection switch 110 prioritizes the available network links based on the determined data transfer request type and wireless link quality metrics and according to a prioritization policy. For example, the prioritization policy of the wireless connection switch 110 may include prioritization based on, in a predetermined order of priority, signal strength, maximum signal range, transmission error rate, latency, data throughput, data transmission cost, QoS, and other characteristics of the wireless network links. The wireless link quality metrics may be either queried at a time of the data transfer request or be based, for example, on previously made connection to the at least one of the available network links. Of course, it is contemplated that the order of priority may change and the wireless connection switch 110 may prioritize the available network links according to the new predetermined order of priority of the network link characteristics.

In one example, the wireless connection switch 110 may determine, in response to receiving a data transfer request, that the data transfer request type is a request to place an eCall. The wireless connection switch 110 may then determine that available wireless network links include cellular, Wi-Fi, and tethered Bluetooth networks. The wireless connection switch 110 may then determine wireless link quality metrics of each of the available wireless network links. The wireless connection switch 110 may further determine based on the determined wireless link characteristics of each of the available network links an optimal wireless network link to place the eCall. For example, based on the determined network link characteristics and in view of wireless link quality metrics, the wireless connection switch 110 may rank lower an available Wi-Fi and tethered Bluetooth network links and rank higher an available cellular connection.

The prioritization policy of the wireless connection switch 110 may further include determining, based on vehicle speed, estimated time the vehicle 102 will remain within signal range of at least one of the available wireless network links. In another example, the prioritization policy of the wireless connection switch 110 may include accessing a calendar on the mobile device 106 to determine location of upcoming appointments. In still another example, the prioritization policy of the wireless connection switch 110 may further include determining, based on received navigation route of the vehicle 102, upcoming wireless network links.

At block 137 the wireless connection switch 110 connects to an optimal wireless network link based on prioritization policy. At this point the control strategy 126 may end. In some embodiments the control strategy 126 described in FIG. 3 may be repeated in response to receiving a data transfer request.

Figure 4:
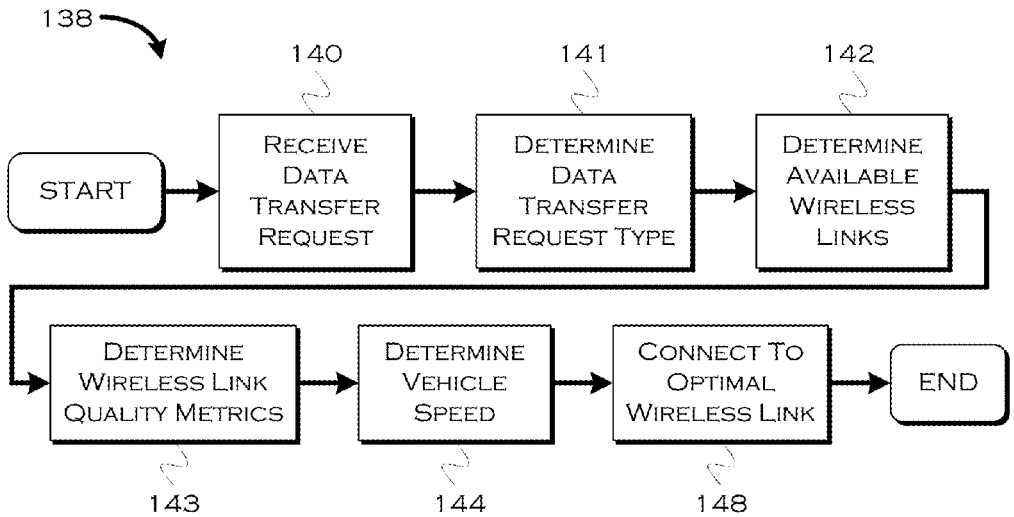
FIG. 4 is a flowchart illustrating an algorithm for prioritizing available wireless network links based on vehicle speed.

Referring now to FIG. 4, a control strategy 138 for using vehicle speed to prioritize available wireless network links is shown. The control strategy 138 may begin at block 140 where the wireless connection switch 110 receives a data transfer request. The wireless connection switch 110 determines at block 141 a type of the data transfer request, such as a request to download or to stream multimedia, a request to place an eCall, and so on. At block 142 the wireless connection switch 110 determines available wireless network links, for example, by scanning signal frequency bands.

At block 143 the wireless connection switch 110 determines wireless link quality metrics, such as signal strength, signal range, and so on, of at least one of the available wireless network links. As described in reference to FIG. 3, the wireless link quality metrics may be either queried at a time of the data transfer request or be based, for example, on previously made connection to the at least one of the available network links. The wireless connection switch 110 at block 144 determines vehicle speed. For example, the wireless connection switch 110 may request vehicle speed from the ECM via the vehicle data bus. In one example, the wireless connection switch 110 further determines whether the vehicle speed is above a predetermined threshold, e.g., 5 miles/hour (mph).

The wireless connection switch 110 at block 148 connects to an optimal wireless network link in response to determining the vehicle speed. For example, in response to determining that the vehicle speed is above a predetermined threshold, the wireless connection switch 110 may determine that an available WLAN connection is less optimal and an available cellular connection is more optimal to complete the requested data transfer. In another example, the wireless connection switch 110 may connect to the optimal network link in response to determining the vehicle speed and expected path of travel of the vehicle 102 relative to the available network links. Thus, in one example, the wireless connection switch 110 may connect to a first network link and not a second network link in response to determining that the vehicle 102 is traveling toward the first network link and away from the second wireless link. At this point the control strategy 138 may end. In some embodiments the control strategy 138 described in FIG. 4 may be repeated in response to receiving a data transfer request.

Figure 5:
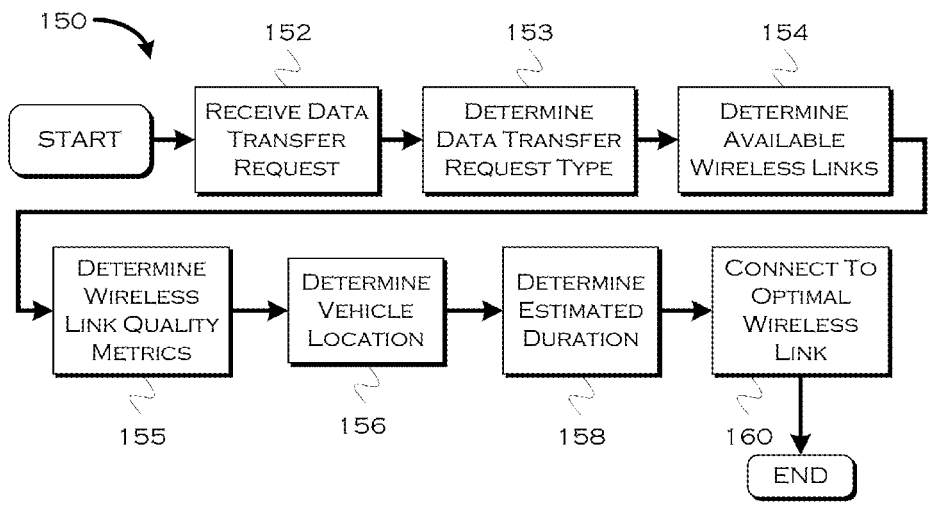
FIG. 5 is a flowchart illustrating an algorithm for prioritizing available wireless network links based on vehicle location.

In reference to FIG. 5, a control strategy 150 for prioritizing available wireless network links based on vehicle location is shown. The control strategy 150 may begin at block 152 where the wireless connection switch receives a data transfer request. For example, the wireless connection switch 110 may receive a request to upload, download, or stream a multimedia file, e.g., an image file, text file, video file, audio file, etc. At block 153 the wireless connection switch 110 determines a type of the data transfer request, such as a request to download or to stream multimedia, a request to place an eCall, and so on.

The wireless connection switch 110 determines available wireless network links at block 154, for example, by scanning signal frequency bands. At block 155 the wireless connection switch 110 determines wireless link quality metrics, such as signal strength, signal range, and so on, of at least one of the available wireless network links, queried at a time of the data transfer request or based, for example, on previously made connection to the at least one of the available wireless network links.

The wireless connection switch 110 at block 156 determines location of the vehicle 102. For example, the wireless connection switch 110 may request GPS coordinates of the vehicle 102 from the navigation module via the vehicle data bus. At block 158 the wireless connection switch 110 determines estimated duration of time the vehicle 102 will be at the determined location. For example, the wireless connection switch 110 may determine based on the received GPS coordinates that the vehicle 102 is currently at a coffee shop and that an average amount of time spent at that location is 10 minutes. The estimated duration of time the vehicle 102 will be at the determined location may be determined based on a type of location, e.g., bank, library, dealership, doctor's office, and so on. In the alternative, the estimated duration of time may be based on a duration of time the vehicle 102 was at the determined location during a previously made connection.

At block 160 the wireless connection switch 110 connects to at least one of the available wireless network links, in response to determining that the at least one of the available wireless network links is an optimal wireless network link based, for example, on vehicle location and estimated amount of time the vehicle 102 will be at that location. For example, the wireless connection switch 110 may determine that an available WLAN connection is an optimal wireless network link when the estimated amount of time the vehicle 102 will be at the determined location is sufficient to complete the requested data transfer. At this point the control strategy 150 may end. In some embodiments the control strategy 150 described in FIG. 5 may be repeated in response to receiving a data transfer request or another request.

Figure 6:
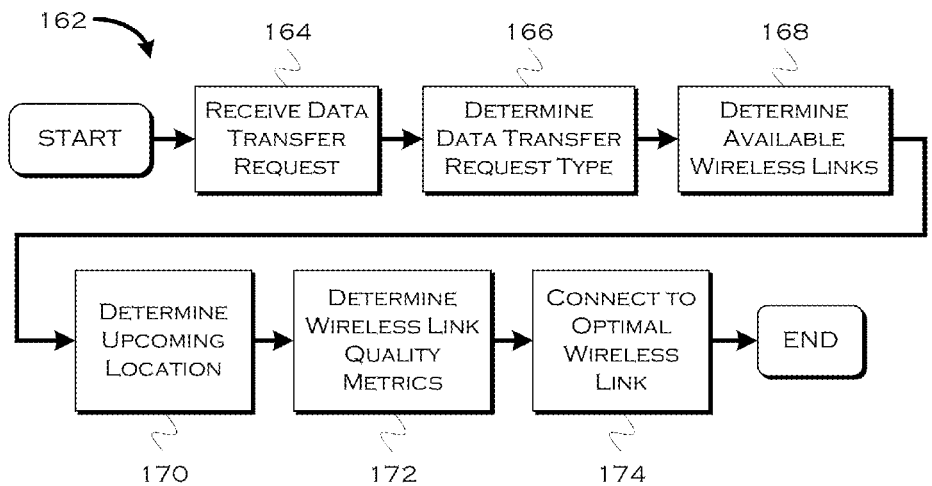
FIG. 6 is a flowchart illustrating an algorithm for prioritizing available wireless network links based on upcoming location of the vehicle.

Referring now to FIG. 6, a control strategy 162 for prioritizing available wireless network links based on an upcoming vehicle location is shown. The control strategy 162 may begin at block 164 where the wireless connection switch 110 receives a data transfer request from the mobile device 106. At block 166 the wireless connection switch 110 determines a type of the data transfer request, such as a request to download or to stream multimedia, a request to place an eCall, and so on. The wireless connection switch 110 at block 168 determines available wireless network links, for example, by scanning signal frequency bands.

The wireless connection switch 110 determines at block 170 the upcoming location of the vehicle 102. For example, the wireless connection switch 110 may access a mobile device calendar to determine location for an upcoming appointment, e.g., dealership or doctor's appointment. In another example, the wireless connection switch 110 may reference vehicle navigation history to determine an upcoming location of the vehicle 102 based on a previously used navigation route. Of course, other configurations for determining the upcoming vehicle location are also contemplated.

The wireless connection switch 110 determines at block 172 wireless link quality metrics, such as signal strength, signal range, and so on, of at least one of the available network links and a network link associated with the upcoming location, whether queried at a time of the data transfer request or based, for example, on previously made connection to the at least one of the available network links and the network link associated with the upcoming location. At block 174, the wireless connection switch 110 connects to an optimal network link based on the determined data transfer request type and the determined wireless link quality metrics of the available network links and the network link associated with the upcoming location.

For example, the wireless connection switch 110 may determine that, based on the determined data transfer request type and the determined wireless link quality metrics of the available network links and a WLAN connection at the dealership or the doctor's office where the appointment is scheduled, the WLAN connection is more optimal than the at least one of the available network links. In another example, the wireless connection switch 110 may determine that a known WLAN connection along a historic navigation route is more optimal, based on the determined data transfer request type and the determined wireless link quality metrics of the available network links and the known WLAN connection along the historic navigation route. The historic navigation route may, for example, be based on one of a plurality of previously taken navigation routes stored in the navigation module.

The wireless connection switch 110 may thus delay completing a data transfer until the vehicle 102 reaches the upcoming location. For example, the wireless connection switch 110 may connect to the wireless network link associated with the upcoming location in response to determining that the wireless network link associated with the upcoming location has been detected. In another example, the wireless connection switch 110 may connect to the wireless network link along the historic navigation route in response to determining that the wireless network link along the historic navigation route has been detected.

In yet another example, the wireless connection switch 110 may identify a first network link having a lower signal strength and located further away from a location of the vehicle 102, identify a second network link having a higher signal strength and located closer to the location of the vehicle 102, and connect to the first network link based on a speed of the vehicle 102 and an expected path of travel toward the first network link. At this point the control strategy 162 may end. In some embodiments, the control strategy 162 described in FIG. 6 may be repeated in response to receiving a data transfer request or another request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
   a network switch disposed within a vehicle and configured to, in response to a data transfer request, establish a wireless connection with one of a plurality of network links according to a prioritization of the network links based on a combination of (i) network quality metrics required for a type of the request, (ii) a speed of the vehicle, and (iii) an expected path of travel of the vehicle relative to the network links.

2. The system of claim 1, wherein the prioritization is further based on historical data indicative of duration of connection to at least one of the network links.

3. The system of claim 1, wherein the prioritization is further based on network quality metrics including signal strength, maximum signal range, transmission error rate, latency, data throughput, QoS, reliability, or data transmission cost.

4. The system of claim 1, wherein the prioritization is further based on an estimated duration for which the vehicle will remain at a location.

5. The system of claim 1, wherein the wireless connection switch is further configured to perform the prioritization in response to detecting an on-location network link associated with an upcoming location of the vehicle.

6. The system of claim 5, wherein the upcoming location of the vehicle is based on a calendar entry of a mobile device.

7. The system of claim 5, wherein the upcoming location of the vehicle is based on a historic navigation route.

8. The system of claim 1 further comprising a vehicle gateway module, wherein the wireless connection switch is integrated within the vehicle gateway module.

9. A method for a vehicle comprising:
   in response to receiving a data transfer request, establishing a wireless connection with one of a plurality of network links according to a prioritization of the network links based on a combination of (i) network quality metrics required for a type of the request, (ii) a speed of the vehicle, and (iii) an expected path of travel of the vehicle relative to the network links.

10. The method of claim 9, wherein the prioritization is further based on historical data indicative of duration of connection to at least one of the network links.

11. The method of claim 9, wherein the prioritization is further based on network quality metrics including signal strength, maximum signal range, transmission error rate, latency, data throughput, QoS, reliability, or data transmission cost.

12. The method of claim 9, wherein the prioritization is further based on a location of the vehicle.

13. The method of claim 9, wherein the prioritization is further based on an estimated duration for which the vehicle will remain at a location.

14. The method of claim 9, further comprising performing the prioritization in response to detecting an on-location network link associated with an upcoming location of the vehicle.

15. The method of claim 14, wherein the upcoming location of the vehicle is based on a calendar entry of a mobile device.

16. The method of claim 14, wherein the upcoming location of the vehicle is based on a historic navigation route.

17. A method for a vehicle comprising:
   in response to receiving a data transfer request,
       identifying first and second network links, the first network link having a lower signal strength and being located further away from the vehicle than the second network link, and
       establishing a wireless connection with the first network link and not the second network link based on a combination of (i) network quality metrics required for a type of the request, (ii) vehicle speed, and (iii) an expected path of travel of the vehicle toward the first network link and away from the second network link.

18. The vehicle wireless network access system of claim 1, wherein the type of the request includes making a voice call, downloading digital media, streaming digital media, performing data logging, conducting data analytics, checking a calendar entry, or analyzing a navigation route.

19. The method of claim 9, wherein the type of the request includes making a voice call, downloading digital media, streaming digital media, performing data logging, conducting data analytics, checking a calendar entry, or analyzing a navigation route.

20. The vehicle system of claim 1, wherein the speed of the vehicle is greater than 5 miles-per-hour.

* * * * *